US012803407B2

(12) United States Patent
Krasnoff

(10) Patent No.: US 12,803,407 B2
(45) Date of Patent: Nov. 17, 2026

(54) CENTRIPETAL MAGNET ACCELERATOR UTILIZING MAGNETS TO PRODUCE ROTATIONAL MOTION FOR GENERATING ELECTRICITY

(71) Applicant: Duplicent, LLC, Santa Monica, CA (US)

(72) Inventor: Curren Emmett Krasnoff, Santa Monica, CA (US)

(73) Assignee: Duplicent, LLC, Santa Monica, CA (US)

(*) Notice: Subject to any disclaimer, the term of this patent is extended or adjusted under 35 U.S.C. 154(b) by 0 days.

(21) Appl. No.: 19/010,717

(22) Filed: Jan. 6, 2025

(65) Prior Publication Data

US 2026/0031697 A1 Jan. 29, 2026

Related U.S. Application Data

(63) Continuation of application No. 18/320,549, filed on May 19, 2023, now Pat. No. 12,191,747, which is a continuation of application No. 17/891,040, filed on Aug. 18, 2022, now Pat. No. 11,682,960, which is a continuation of application No. 17/465,389, filed on Sep. 2, 2021, now Pat. No. 11,451,125, which is a continuation of application No. PCT/US2021/026021, filed on Apr. 6, 2021.

(60) Provisional application No. 63/146,619, filed on Feb. 6, 2021, provisional application No. 63/005,538, filed on Apr. 6, 2020.

(51) Int. Cl.

*H02K 53/00* (2006.01)
*H02K 7/02* (2006.01)
*H02K 7/116* (2006.01)
*H02K 5/00* (2006.01)
*H02K 5/16* (2006.01)
*H02K 35/02* (2006.01)
*H02K 99/00* (2014.01)

(52) U.S. Cl.

CPC ............... *H02K 53/00* (2013.01); *H02K 7/02* (2013.01); *H02K 7/116* (2013.01); *H02K 5/00* (2013.01); *H02K 5/16* (2013.01); *H02K 35/02* (2013.01); *H02K 99/00* (2016.11)

(58) Field of Classification Search

CPC .. H02K 5/00; H02K 5/16; H02K 7/02; H02K 7/116; H02K 35/02; H02K 53/00; H02K 99/00

USPC ........................................................... 310/74

See application file for complete search history.

(56) References Cited

U.S. PATENT DOCUMENTS 8,810,050 B1 * 8/2014 Reiner .................. H02K 53/00 290/1 A 2013/0175890 A1 * 7/2013 Atwood ................ H02K 53/00 310/46

(Continued)

*Primary Examiner* — Rashad H Johnson

(74) *Attorney, Agent, or Firm* — Crowell & Moring LLP

(57) ABSTRACT

An assembly for generating electricity includes a circular track configured to rotate about a first axis of rotation, the circular track comprising a first magnet having a face that is at an angle with respect to the first axis of rotation, a second magnet positioned at a center of the circular track, wherein a face of the second magnet is an opposite polarity to the face of the first magnet such that the second magnet repels the first magnet to rotate the circular track, and a device for converting rotational motion from the circular track into electricity.

20 Claims, 5 Drawing Sheets

(56) References Cited

U.S. PATENT DOCUMENTS

| | | | | |
|---|---|---|---|---|
| 2014/0252902 | A1* | 9/2014 | Binkowski | H02K 31/02 310/156.08 |
| 2017/0163103 | A1* | 6/2017 | Amer | H02K 1/17 |
| 2018/0226874 | A1* | 8/2018 | Ho | H02K 49/102 |
| 2018/0262084 | A1* | 9/2018 | McReynolds | F16C 32/0402 |
| 2021/0143723 | A1* | 5/2021 | De Gasperis | H02K 53/00 |
| 2021/0281131 | A1* | 9/2021 | McKee, Jr. | H02K 1/17 |
| 2021/0399619 | A1* | 12/2021 | Krasnoff | H02K 53/00 |

* cited by examiner

CENTRIPETAL MAGNET ACCELERATOR UTILIZING MAGNETS TO PRODUCE ROTATIONAL MOTION FOR GENERATING ELECTRICITY

CROSS-REFERENCE TO RELATED PATENT APPLICATIONS

This application is a continuation of U.S. patent application Ser. No. 18/320,549, filed May 19, 2023, entitled "CENTRIPETAL MAGNET ACCELERATOR UTILIZING MAGNETS TO PRODUCE ROTATIONAL MOTION FOR GENERATING ELECTRICITY," which is a continuation of U.S. patent application Ser. No. 17/891,040, filed Aug. 18, 2022, now U.S. Pat. No. 11,682,960, entitled "CENTRIPETAL MAGNET ACCELERATOR UTILIZING MAGNETS TO PRODUCE ROTATIONAL MOTION FOR GENERATING ELECTRICITY," which is a continuation of U.S. patent application Ser. No. 17/465,389, now U.S. Pat. No. 11,451,125, entitled "CENTRIPETAL MAGNET ACCELERATOR," filed Sep. 2, 2021, which is a continuation of International Patent Application No. PCT/US2021/026021, filed Apr. 6, 2021, which claims the benefit of and priority to U.S. Provisional Patent Application No. 63/146,619, filed Feb. 6, 2021, and U.S. Provisional Patent Application No. 63/005,538, filed Apr. 6, 2020, all of which are incorporated herein by reference in their entireties.

BACKGROUND

The present disclosure relates generally to a device for generating electricity. More specifically, the present disclosure relates to a device that utilizes the attraction and repulsion of magnets to produce rotational motion for generating electricity.

In today's day and age, we face an ever-increasing demand for clean and renewable sources of electrical energy. Clean and renewable energies can help to reduce pollution and carbon dioxide (CO2) emissions, and can even provide energy to people and/or places that current lack access to safe and reliable electricity. Thus, technologies that can generate clean energy with little to no resource consumption may be desirable to meet global energy demands.

SUMMARY

One embodiment of the present disclosure is an assembly for generating electricity. The assembly includes a circular track configured to rotate about a first axis of rotation, the circular track comprising a first magnet having a face that is at an angle with respect to the first axis of rotation, a second magnet positioned at a center of the circular track, wherein a face of the second magnet is a same polarity to the face of the first magnet such that the second magnet repels the first magnet to rotate the circular track, and a device for converting rotational motion from the circular track into electricity.

In some embodiments, the circular track further includes a plurality of magnets in addition to the first magnet, and each of the plurality of magnets and the first magnet are equally spaced around the circumference of the circular track.

In some embodiments, the assembly further includes a plurality of magnets in addition to the second magnet, and the plurality of magnets are stacked on a top side of the second magnet to increase a magnetic strength of the second magnet.

In some embodiments, the second magnet is in the shape of a conc, a pyramid, a hemisphere, a conical frustum, or a cylinder.

In some embodiments, the second magnet is formed by a plurality of magnets positioned on an outer surface of a support member, the support member in the shape of a cone, a pyramid, a hemisphere, a conical frustum, or a cylinder.

In some embodiments, the first magnet is triangular in shape such that the face of the first magnet is at an angle with respect to the first axis of rotation and a side of the first magnet opposite the face is perpendicular to the first axis of rotation.

In some embodiments, the assembly further includes one or more support members extending from the circular track to the second magnet to support the second magnet.

In some embodiments, the assembly further includes a housing configured to enclose the circular track and the second magnet, and the housing is structured to maintain a vacuum.

In some embodiments, the assembly for converting rotational motion from the circular track into electricity is an electromagnetic device including a rotor and a stator. In some embodiments, other movement harnessing devices may be used to convert rotational motion from the circular track into electricity.

In some embodiments, the assembly further includes a shaft extending from the device for converting rotational motion from the circular track into electricity to the circular track, the shaft defining the first axis of rotation.

In some embodiments, the assembly further includes a gear set positioned between the device for converting rotational motion from the circular track into electricity and the shaft, the gear set configured to increase or decrease a rotational speed of the device for converting rotational motion from the circular track into electricity according to one or more different gear ratios.

In some embodiments, at least one of the first magnet or the second magnet are electromagnets, and a portion of the electricity generated by the electromagnetic device is utilized to power the at least one of the first magnet or the second magnet.

In some embodiments, the circular track is constructed from a conductive material such that the portion of the electricity utilized to power the first magnet is provided to the first magnet via the circular track.

In some embodiments, the circular track further includes an upper track and a lower track, and the first magnet is positioned between the upper track and the lower track.

In some embodiments, the lower track has a smaller radius than the upper track.

BRIEF DESCRIPTION OF THE DRAWINGS

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a device for generating electricity using the effects of magnetic attraction and repulsion is shown, according to some embodiments. In particular, the device may include a first magnet or a set of magnets positioned around a circular track assembly, with a second magnet or set of magnets at or near the center of the circular track assembly. As described herein, the first and second magnets, or sets of magnets, may be permanent magnets (e.g., neodymium), electromagnetics, or superconducting magnets. The first and second magnets or sets of magnets may be positioned such that the faces (e.g., a side of the first magnet substantially facing the second magnet, or vice versa) of these magnets have same polarities. For example, a face of the first magnet may constitute the north pole of the magnet, while a face of the second magnet may constitute the north pole of the magnet. Thus, the first and second magnets may repel each other.

In some embodiments, the second magnet may be fixed in position with respect to the first magnet and/or the circular track assembly, such that the force of the second magnet repelling the first magnet causes at least one of the first magnet or the entire circular track assembly to rotate about an axis of rotation (e.g., at the center of the circular track assembly). This rotational motion may be harnessed to rotate a shaft connected to an electromagnetic device (e.g., a generator), and the electromagnetic device may be configured to convert this rotational motion into electrical energy. Advantageously, this device may require little to no energy to operate, instead relying on the inherent attraction and/or repulsion of two collocated magnets to produce electricity. Further, as will be made evident in the present disclosure, this device may occupy a much smaller footprint than other electricity producing devices.

Figure 1:
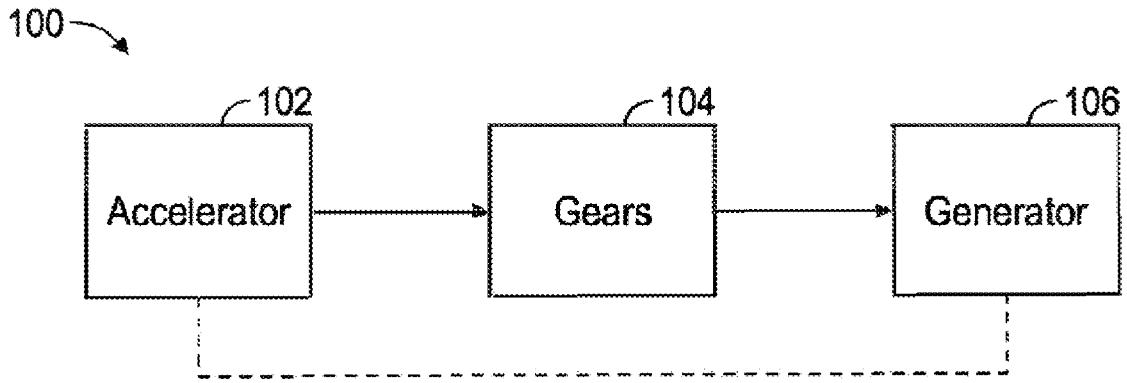
FIG. 1 is a block diagram of a system for generating electricity, according to some embodiments.

Referring first to FIG. 1, a block diagram of a system 100 for generating electricity is shown, according to some embodiments. Unlike many other systems for generating electricity, system 100 may provide clean and renewable electricity while requiring little input energy (e.g., electricity, natural gas, coal, etc.) to operate. Instead, as mentioned above, system 100 may harness the attraction and repulsion of magnets to rotate an electromagnetic device for generating electricity. In particular, system 100 includes an accelerator 102, as referred to herein as a centripetal magnet accelerator, which includes at least two magnets positioned such that same poles (e.g., north or south) of the magnets are at least partially facing each other. Thus, the same poles cause a repulsive force between the two magnets, driving the magnets away from each other.

Accelerator 102 may include a circular track assembly, or other similar track assembly, to which at least one of the magnets can be coupled. In some embodiments, the circular track assembly is configured to rotate about a central axis of rotation. In other embodiments, the magnet is movably coupled to the circular track assembly, such that the magnet may travel around the circular track. In either case, the remaining magnet or magnets may be positioned in a center of the circular track assembly, opposing the magnet coupled to the circular track and thereby "pushing" (e.g., by a repulsive force) the first magnet around the track and/or rotating the circular track assembly. Accelerator 102 is described in greater detail below with respect to FIGS. 2A and 2B.

Accelerator 102 may be coupled to gears 104, such as by a connecting shaft (e.g., a drive shaft, a prop shaft, etc.). Gears 104 may be a gear set including one or more spur gears, helical gears, bevel gears, miter gears, worm gears, screw gears, planetary gears, etc., configured to either increase or decrease the rotational speed (i.e., increase or decrease the angular velocity) of the shaft, and in some cases configured to reverse the direction of rotation of the shaft. Accordingly, system 100 may include an input shaft that couples accelerator 102 to gears 104, and an output shaft that couples gears 104 to a generator 106. In some embodiments, gears 104 may be selectively engaged to adjust the speed of rotation of the output shaft, and thus the speed of rotation of generator 106, as discussed in greater detail below.

Generator 106 may be any electromagnetic device configured to convert rotational motion into electrical energy. For example, generator 106 may include a stator formed by a conductive wire wound on a metal core, and a rotor formed by one or more magnets positioned on a circular housing (e.g., a metal hoop or flat-bottomed bowl). The rotor may be rotated by the output shaft of gears 104, thereby generating a rotating magnetic field that induces a voltage difference between the windings of the stator, producing alternating current (AC). In some embodiments, generator 106 may include a voltage regulator for regulating the output voltage of the device, and/or may include a converter for converting the output AC of generator 106 to direct current (DC). A generator that uses a coper coil may be used. The generator may be a turbine generator. The generator may be rotated by a device other than the gears and connecting shaft 214. In some embodiments the bottom of the circular track assembly 208 defines a single gear that rotates and another gear(s) may fit into the bottom circular track assembly 208 gear perpendicularly, where the perpendicular gear(s) may be attached to a rod that rotates a generator to produce electricity.

In some embodiments, as discussed in greater detail below, one or more of the magnets included in accelerator 102 may be electromagnets, which produce a magnetic field with the application of an electric current. For example, a basic electromagnet can be formed by wrapping a length of conductive wire (e.g., copper) around a metal core. An electric current can then be applied to the conductive wire, producing the magnetic field. In some such embodiments, generator 106 may be configured to provide at least a portion of the produced electricity to accelerator 102, in order to power the electromagnets.

Figure 2A:
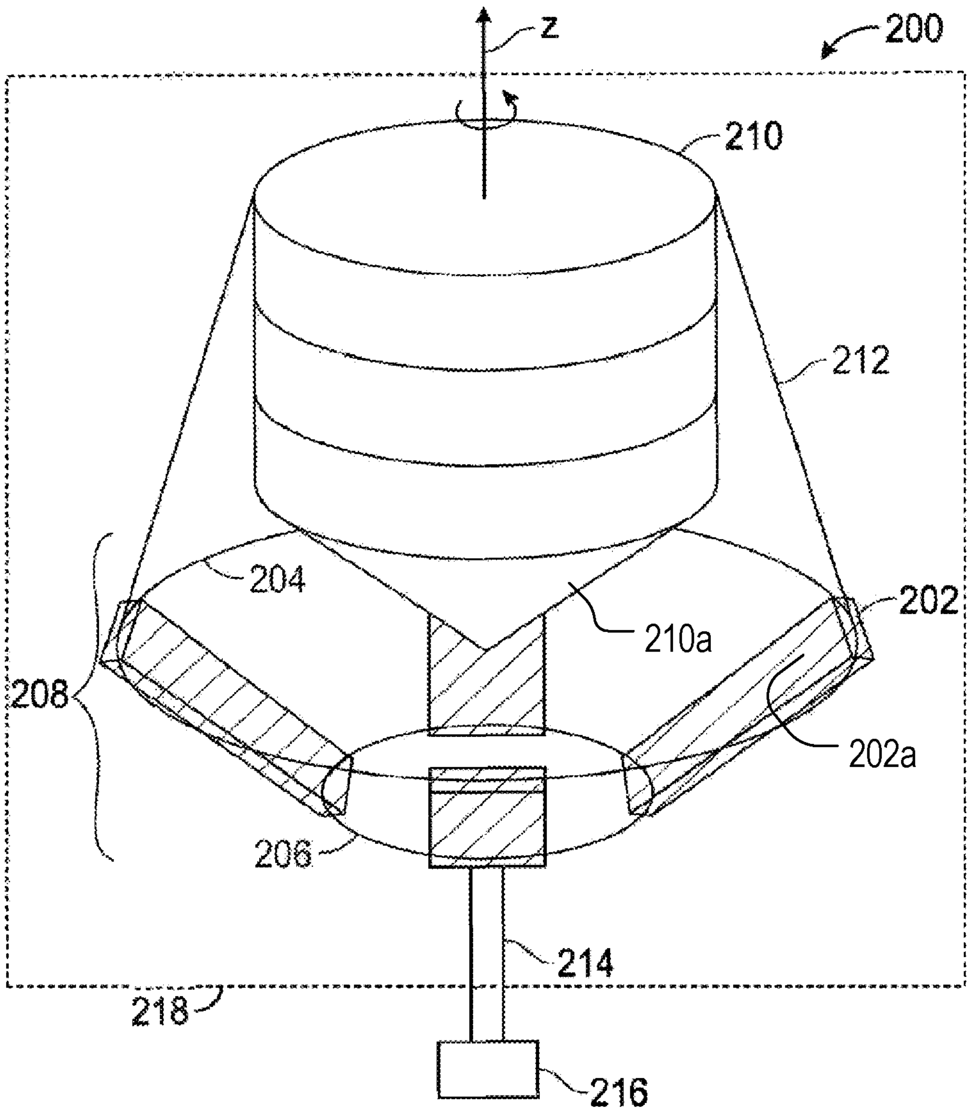
FIGS. 2A and 2B are diagrams of centripetal magnet accelerators, according to some embodiments.
Figure 2B:
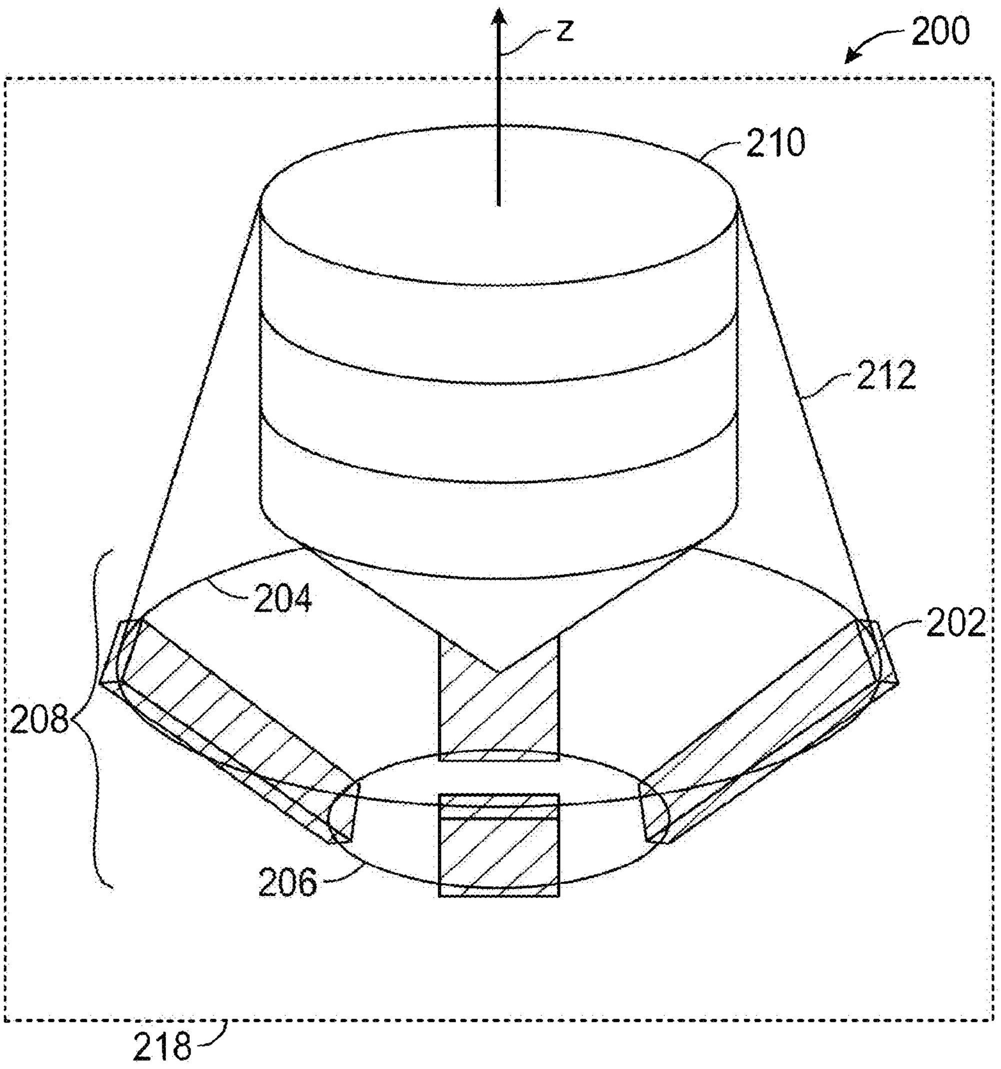

Referring now to FIGS. 2A and 2B, a diagram of a centripetal magnet accelerator 200 is shown, according to some embodiments. Accelerator 200 may be the same as, or nearly the same as, accelerator 102 described above, for example. Accordingly, accelerator 200 may be configured to produce rotational motion, which can be converted into electricity by an electromagnetic device (e.g., generator 106). Advantageously, accelerator 200 may consume little to no energy to produce said rotational motion, and may therefore be more cost and energy-efficient than other devices for generating electricity. Additionally, as mentioned above, accelerator 200 may produce little to no emissions, resulting in clean and renewable energy.

Accelerator 200 is shown to include a plurality of first magnetic units 202. In some embodiments, first magnetic units 202 may be individual magnets, or may include a plurality of magnets (e.g., stacked, positioned side-by-side, etc.). For example, first magnetic units 202 may include a single, rectangular bar magnet as shown in FIGS. 2A and 2B, though it will be appreciated that first magnetic units 202 may include any number, shape, and/or size of magnets. In the example shown, accelerator 200 includes at least four of first magnetic units 202, although it will also be appreciated that accelerator 200 can include any number of first magnetic units 202. Additional configurations of first magnetic units 202 are described in greater detail below, with respect to FIGS. 3A-3D.

Each of first magnetic units 202 is coupled (e.g., permanently, movably, or removably) to an upper circular track 204 and/or a lower circular track 206. Together, upper circular track 204 and lower circular track 206 form a circular track assembly 208 configured to support first magnetic units 202. In some embodiments, upper circular track 204 and lower circular track 206 are fixedly or removably coupled by one or more support members (not shown). For example, support members may extend from upper circular track 204 to lower circular track 206, or may extend from one or both of upper circular track 204 and lower circular track 206 to another mounting surface (e.g., a housing 218, as described below). In some embodiments, circular track assembly 208 is configured to rotate about a central axis of rotation z, as discussed in greater detail below. In other embodiments, circular track assembly 208 is fixed in rotation, and first magnetic units 202 are configured to rotate around circular track assembly 208.

In some embodiments, such as the embodiment shown in FIGS. 2A and 2B, lower circular track 206 has a smaller radius that upper circular track 204. In other embodiments, upper circular track 204 and lower circular track 206 have a similar or identical radius. One or both of upper circular track 204 and lower circular track 206 may be formed from lightweight materials, such as aluminum, thereby reducing the weight of circular track assembly 208 and accelerator 200. In some embodiments, upper circular track 204 and/or lower circular track 206 are formed of a conductive material (e.g., aluminum, iron, etc.) such that electricity may be passed through upper circular track 204 and lower circular track 206, and provided to first magnetic units 202.

Accelerator 200 is also shown to include a second magnetic unit 210. Second magnetic unit 210 may include one or more magnets and may be positioned at a center of circular track assembly 208 (e.g., and thereby accelerator 200). Second magnetic unit 210 may be configured to provide a repulsive force against first magnetic units 202, thereby causing first magnetic units 202 and/or circular track assembly 208 to rotate. Accordingly as shown in FIG. 2A, a face (210*a*) of second magnetic unit 210 may be a same polarity of a face (202*a*) of each of first magnetic units 202. For example, the face of second magnetic unit 210 may be configured as a north pole, while the face of each of first magnetic units 202 may be configured as a north pole. In this manner, when first magnetic units 202 and second magnetic unit 210 are brought in close proximity, the magnetic fields of first magnetic units 202 and second magnetic unit 210 may oppose one another, causing a repulsive force. Additionally, rotational motion may be at least partially sustained due to the centripetal force of the rotating first magnetic units 202 and/or circular track assembly 208.

This repulsive force, caused by the same polarities of the faces of first magnetic units 202 and second magnetic unit 210, causes either the first magnetic units 202 or the circular track assembly 208 to rotate about an axis of rotation. The axis of rotation, z, may be defined by a connecting shaft 214, configured to transfer the rotational motion of first magnetic units 202 and/or circular track assembly 208 to an electromagnetic device 216 (e.g., a generator). In other words, the rotation of first magnetic units 202 and/or circular track assembly 208 may cause connecting shaft 214 to rotate, thereby causing components (e.g., a rotor) of electromagnetic device 216 to rotate to produce electricity. Accordingly, connecting shaft 214 may be coupled to one or more of first magnetic units 202 and/or circular track assembly 208, depending on a configuration of accelerator 200.

In some embodiments, as discussed above with respect to FIG. 1, accelerator 200 may include more than one connecting shaft 214. In such embodiments, accelerator 200 may also include a gear set (e.g., gears 104) positioned between accelerator 200 and electromagnetic device 216, in order to increase or decrease the speed at which electromagnetic device 216 rotates. For example, a first connecting shaft may couple first magnetic units 202 and/or circular track assembly 208 to the gear set, while a second connecting shaft couples the gear set to electromagnetic device 216. In some embodiments, a ratio of the gear set may be selectively modified to adjust the rotational speed of electromagnetic device 216.

In some embodiments, such as the embodiments shown in FIGS. 2A and 2B, second magnetic unit 210 includes at least one cone-shaped magnet at the lowermost portion of the unit. A cone-shaped second magnetic unit 210 may provide an even magnetic field, and thus an evenly distributed repulsive force against first magnetic units 202. However, it will be appreciated that second magnetic unit 210, or at least the lowermost portion of second magnetic unit 210, may be any suitable shape. For example, at least a portion of second magnetic unit 210 may be shaped as a cone, a pyramid, a hemisphere, a conical frustum, a cylinder, etc.

In some embodiments, second magnetic unit 210 may include a lightweight support structure (e.g., an aluminum cylinder or cone) to which a plurality of smaller magnets may be mounted. Accordingly, in such embodiments, the face or surface of second magnetic unit 210 may be formed of multiple individual magnets, rather than one continuous magnet. Additionally, in some embodiments, the lightweight support structure may be shaped in any of a cone, a pyramid, a hemisphere, a conical frustum, a cylinder, etc. In some embodiments, the conical portion of second magnetic unit 210 may be formed from a plurality of wedge-shaped magnets having a common strength and size.

In some embodiments, second magnetic unit 210 includes multiple magnets that are stacked or otherwise positioned such that the magnetic fields of the magnets combine to increase the overall strength of second magnetic unit 210. As shown, for example, a plurality of cylindrical magnets may be stacked on a cone shaped magnet to form second magnetic unit 210. Thus, in some embodiments, second magnetic unit 210 is stronger than first magnetic units 202 (e.g., second magnetic unit 210 has a stronger magnetic field). In this manner, the force provided by second magnetic unit 210 against first magnetic units 202 may be significantly stronger than the force provided by first magnetic units 202 against second magnetic unit 210, causing first magnetic units 202 and/or circular track assembly 208 to rotate.

In some embodiments, second magnetic unit 210 is supported by one or more support arms 212. Support arms 212 may extend from second magnetic unit 210 to one or more portions of circular track assembly 208 (e.g., upper circular track 204) as shown, or may extend to housing 218 or to another support structure (not shown). Support arms 212 may be configured to position second magnetic unit 210 at the center of circular track assembly 208, and/or above circular track assembly 208. As shown, for example, second magnetic unit 210 is above circular track assembly 208 such that the cone portion of second magnetic unit 210 extends into the center of circular track assembly 208, thereby positioned in close proximity to first magnetic units 202.

In some embodiments, support arms 212 are adjustable, allowing second magnetic unit 210 to be raised and/or lowered. Raising second magnetic unit 210 away from first magnetic units 202 may decrease the repulsive force between the two components, causing first magnetic units 202 and/or circular track assembly 208 to rotate more slowly, thereby producing less energy. Lowering second magnetic unit 210 toward first magnetic units 202 may increase the repulsive force between the two components, causing first magnetic units 202 and/or circular track assembly 208 to rotate more quickly, thereby producing more energy.

In some embodiments, second magnetic unit 210 may be lowered such that all or at least a significant portion of second magnetic unit 210 is within circular track assembly 208, and thereby in close proximity to first magnetic units 202. Like circular track assembly 208, support arms 212 may be constructed of lightweight and/or conductive materials, such as aluminum, to reduce the weight of accelerator 200 and/or to provide electricity to any of first magnetic units 202 and second magnetic unit 210.

In some embodiments, as mentioned above, either one or both of first magnetic units 202 and second magnetic unit 210 may be electromagnets, rather than permanent (e.g., neodymium) magnets. In such embodiments, at least a portion of the electricity produced by electromagnetic device 216 may be provided to first magnetic units 202 and/or second magnetic unit 210 to power the electromagnets. In some such embodiments, electricity may be provided via connecting shaft 214, lower circular track 206, upper circular track 204, and/or support arms 212, and thus, as mentioned above, any of these components of accelerator 200 may be constructed from lightweight but conductive materials.

Housing 218, as mentioned briefly above, is configured to enclose at least a portion of the device. In the example shown, housing 218 may enclose everything other than electromagnetic device 216, and a portion of connecting shaft 214. However, it will be appreciated that in other cases, additional or fewer components of accelerator 200 may be enclosed by housing 218. For example, in some cases, electromagnetic device 216 may also be enclosed. In some embodiments, housing 218 is formed of a lightweight material such as aluminum, plastic, etc. In some embodiments, components of accelerator 200 such as support arms 212 may be coupled to housing 218, and thus housing 218 may be formed of a material strong enough to support these components and to withstand the forces (e.g., rotation motion) produced by accelerator 200 during operation.

In some embodiments, housing 218 is air-tight such that housing 218 may hold a vacuum. Enclosing the components of accelerator 200 in a vacuum can help to reduce the effects of wind resistance (e.g., drag), which may slow the rotation of first magnetic units 202 and/or circular track assembly 208, thus resulting in wasted energy. In some such embodiments, housing 218 may include a seal (not shown), through which connecting shaft 214 may pass, to allow housing 218 to maintain a vacuum without inhibiting the rotation of connecting shaft 214. In other embodiments, as mentioned above, connecting shaft 214 and/or electromagnetic device 216 may be completely enclosed or completely outside of housing 218.

In some embodiments, multiple accelerators (e.g., multiple of accelerator 200) may be operated in unison to drive (e.g., rotate) either a single connecting shaft 214, or multiple connecting shafts. In this manner, the output of each accelerator 200 may be combined to increase the electricity produced. For example, multiple accelerators may power a single electromagnetic device (e.g., electromagnetic device 216) to increase the electricity produced by the electromagnetic device. In another example, multiple accelerators may provide rotational energy to a gear set, which combines the energy from the multiple accelerators and outputs the combined rotational energy to an electromagnetic device.

In some embodiments, one or a plurality of accelerators (e.g., multiple of accelerator 200 without connecting shaft 214 and electromagnetic device 216) are positioned on a circular track assembly and configured to rotate about the circular track assembly. In such embodiments, a plurality of first magnetic units 202 and/or circular track assembly 208 may rotate about an axis of rotation, however each accelerator 200 (without connecting shaft 214 and electromagnetic device 216) may also move upwards (e.g., moving along the axis z of FIG. 2) and the movement of the accelerator 200 (without connecting shaft 214 and electromagnetic device 216) is harnessed to produce electricity. In some embodiments, a plurality of first magnetic units 202 and/or circular track assembly 208 may not rotate about an axis of rotation and each accelerator 200 (without connecting shaft 214 and electromagnetic device 216) may move upwards (e.g., moving along the axis z of FIGS. 2A and 2B). Second magnet units 210 may not rotate in such embodiments where the accelerator unit moves along the z axis. In some such embodiments, the accelerators are positioned horizontally on the circular track, thereby rotating about the track and/or causing the track to rotate about a second axis of rotation. In some such embodiments, the circular track may be completely filled with accelerators, such that the plurality of accelerators are positioned end-to-end in a "train." In some such embodiments, housing 218 may be an aerodynamic shape (e.g., a cone) to reduce drag on each of the plurality of accelerators as they rotate. In some embodiments, a plurality of circular tracks each including one or a plurality of accelerators may be stacked or positioned in a manner to allow each of the circular tracks and/or accelerators to turn a common shaft or other motion harnessing device, thereby increasing the rotational energy and the amount of electricity generated.

In some embodiments, a single accelerator (e.g., accelerator 200) may include multiple circular track assemblies (e.g., multiple of circular track assembly 208) and/or multiple second magnetic units (e.g., multiple of second magnetic unit 210). For example, two or more circular track assemblies, each including a plurality of first magnetic units 202, may be stacked in series. In this manner, the rotational motion from each circular track assemblies and/or the first magnetic units 202 of each circular track assemblies may be combined to drive a single connecting shaft 214. In some such embodiments, each circular track assembly 208 may be the substantially the same size (e.g., in diameter), such that the multiple circular track assemblies are aligned. In some embodiments, a plurality of stacked circular track assemblies are spaced apart such that the circular track assemblies and/or the first magnetic units 202 of each circular track assembly may rotate freely. In some such embodiments, a connecting shaft may span a length of the stacked circular track assemblies (e.g., at a center of the circular track assemblies) to transfer the rotational energy of all of the circular track assemblies.

Figure 3A:
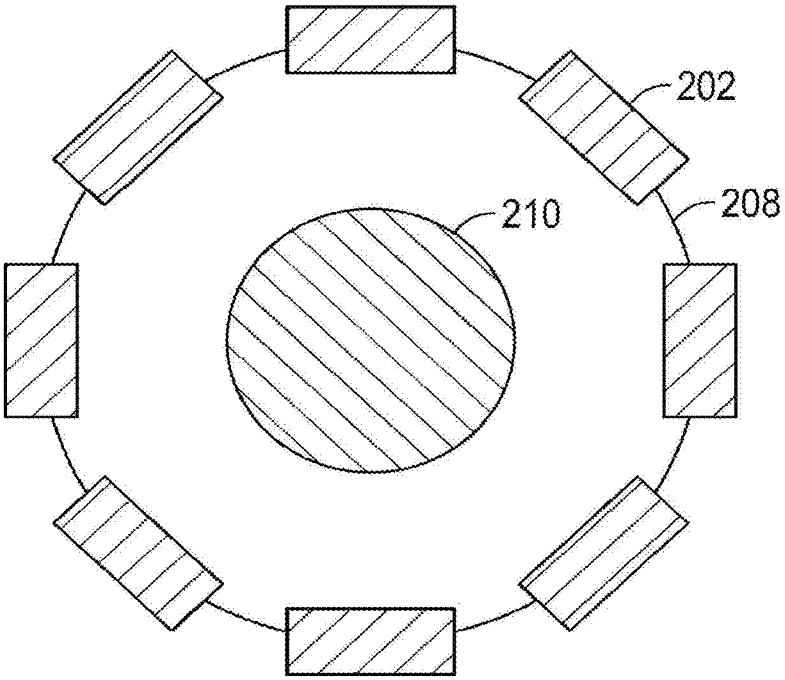
FIGS. 3A-3D are example configurations of a magnets along a track of the centripetal magnet accelerators of FIGS. 2A and 2B, according to some embodiments.

Referring now to FIGS. 3A-3D, example configurations of magnets (e.g., first magnetic units 202) along circular track assembly 208 of accelerator 200 are shown, according to some embodiments. In particular, each of FIGS. 3A-3D may represent a top-down perspective view of accelerator 200, as described in detail above. Turning first to FIG. 3A, an example configuration is shown that includes eight of first magnetic units 202 positioned around circular track assembly 208. As shown, each of first magnetic units 202 may be equidistantly spaced around circular track assembly 208, with second magnetic unit 204 positioned at the center of circular track assembly 208. However, in other embodiments, first magnetic units 202 may not be equally spaced, or there may be no space between each of first magnetic units 202. In some embodiments, each of first magnetic units 202 are positioned at the same height along circular track assembly 208 (e.g., equidistant between upper circular track 204 and lower circular track 206). In other embodiments, each of first magnetic units 202 are positioned at different heights along circular track assembly 208.

As discussed above, in some embodiments, circular track assembly 208 may be configured to rotate about an axis of rotation, which may extend through the center of second magnet unit 210. In other embodiments, each of first magnetic units 202 may be configured to rotate around second magnet unit 210, by following circular track assembly 208. To achieve this rotational motion, second magnet unit 210 may repel first magnetic units 202. In other words, the magnetic field of second magnet unit 210 may interact with the magnetic fields of first magnetic units 202, thereby exert a force on first magnetic units 202 and/or circular track assembly 208, causing first magnetic units 202 and/or circular track assembly 208 to rotate (i.e., spin) about the axis of rotation.

In some embodiments, each of first magnetic units 202 may be constructed from a plurality of magnets that vary in strength. For example, first magnetic units 202 may be constructed from a plurality of thin, elongated, rectangular shaped magnets position next to one another to form a magnetic unit. The thin magnets or magnetic sections may increase in strength in a direction of rotation of first magnetic units 202 and/or circular track assembly 208. For example, if the device of FIG. 3A is configured to rotate counter-clockwise, the weakest magnetic section may be positioned on the rightmost side of each of first magnetic units 202, while the strongest magnetic section is placed on the leftmost side of each of first magnetic units 202. In this manner, the leftmost side of first magnetic units 202 may produce a much stronger magnetic field than the rightmost side of first magnetic units 202, resulting in an increased repulsive force due to second magnetic unit 210. The increase in repulsive force on only one side of each of first magnetic units 202 therefore causes first magnetic units 202 and/or circular track assembly 208 to rotate about the axis of rotation.

In some embodiments, rather than a plurality of individual magnets, first magnetic units 202 may include a single, ring-shaped magnet. In such embodiments, one or both of upper circular track 204 or lower circular track 206 may be replaced with the ring-shaped magnet, or the ring-shaped magnet may be mounted to another support surface (not shown). In some embodiments, the ring-shaped magnet may not rotate, but rather accelerator 200 (without connecting shaft 214 and electromagnetic device 216) may move upwards along the z axis of FIGS. 2A and 2B.

Figure 3B:
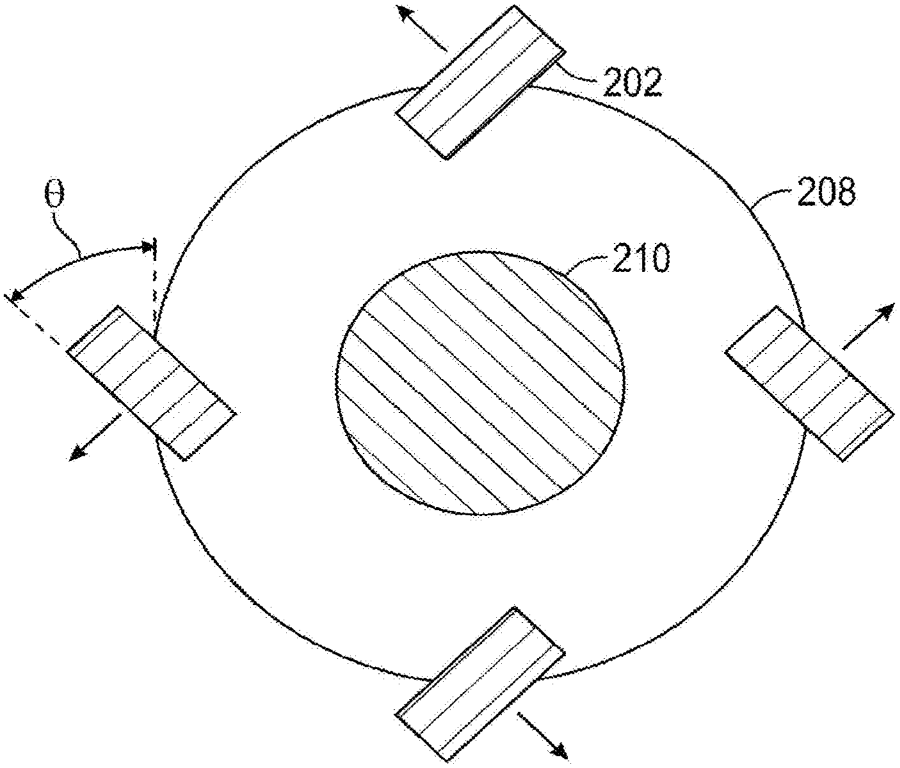

In some embodiments, first magnetic units 202 are positioned at an angle 6 with respect to the axis of rotation, as shown in FIG. 3B. Specifically, first magnetic units 202 may be positioned such that a face of each magnet is at an angle other than perpendicular with the axis of rotation. By angling at least the face of first magnetic units 202 in this manner, a portion of the force applied to each magnet due to the repulsion from second magnetic unit 210 may be directed towards the direction of rotation of the device. In other words, at least a portion of the force applied to each of first magnetic units 202 is perpendicular to the axis of rotation, thereby causing the device to rotate. For example, in FIG. 3B, the force applied to each of first magnetic units 202 is shown as an arrow that is pointing at least partially counter-clockwise, rather than directly outwards from the center of accelerator 200. Accordingly, the force of repulsion due to the same poles of first magnetic units 202 and second magnetic unit 210 may cause first magnetic units 202 and/or circular track assembly 208 to rotate in a counter-clockwise direction.

Figure 3C:
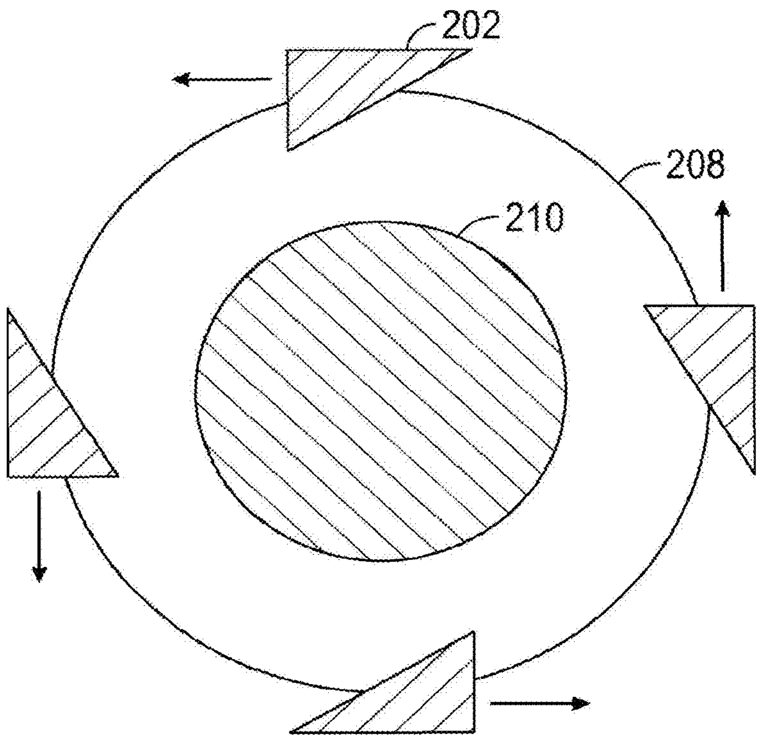

It will also be appreciated that first magnetic units 202 may be any suitable shape, and thus the examples shown and described above are not intended to be limiting. For example, first magnetic units 202 may be shaped as right triangular prisms, as shown in FIG. 3C, or first magnetic units 202 may be any other polygonal shape. As right triangular prisms, a face of each of first magnetic units 202 may be positioned at an angle with respect to the axis of rotation (e.g., other than perpendicular), without having to angle first magnetic units 202 themselves. Thus, the force of repulsion due to the same poles of first magnetic units 202 and second magnetic unit 210 may cause first magnetic units 202 and/or circular track assembly 208 to rotate in a counter-clockwise direction in a similar manner to the configuration of FIG. 3B, described above.

As shown in FIG. 3C, for example, a face of each of first magnetic units 202 (e.g., the hypotenuse of the triangular shaped magnets) is at an angle to the axis of rotation, while the two remaining sides of the first magnetic units 202 are parallel and/or perpendicular to the axis of rotation. In this manner, a force applied to the face of first magnetic units 202 may result in a force at least partially perpendicular to the axis of rotation, causing the device to rotate. Additionally, first magnetic units 202 as shown in FIG. 3C may have a larger amount of magnetic (e.g., ferrous) material along one side of the magnet (e.g., the leading edge), thus increasing the repulsive force at the leading edge of the magnet. In some embodiments, the increased repulsive force in the configuration of FIG. 3C may result in an increased rotational speed of first magnetic units 202 and/or circular track assembly 208, which can result in increased electricity production.

In some embodiments, a position of each of first magnetic units 202 may be rotated and/or flip (e.g., horizontally or vertically) with respect to the configuration shown in FIG. 3C, such that either the opposite or adjacent sides of the triangular magnets is closest to second magnetic unit 210 (e.g., rather than the hypotenuse). In such embodiments, the repulsive force from second magnetic unit 210 may be stronger on one side of first magnetic units 202 (e.g., the widest side, with more magnetic material), causing first magnetic units 202 and/or circular track assembly 208 to rotate.

Figure 3D:
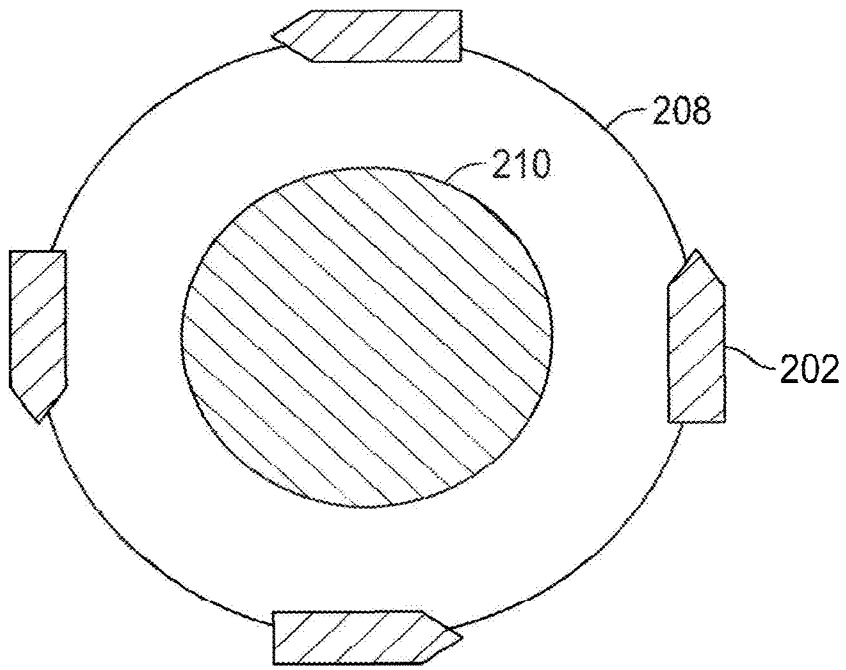

In some cases, it is also advantageous for first magnetic units 202 to be aerodynamic, to reduce the effects of drag due to wind resistance as first magnetic units 202 and/or circular track assembly 208 rotate. As shown in FIG. 3D, for example, first magnetic units 202 may have an aerodynamic edge or tip (e.g., a pointed cone, a triangular prism, etc.) configured to reduce the effects of wind resistance, thus reducing the loss of angular momentum as first magnetic units 202 and/or circular track assembly 208 rotate.

Figure 4A:
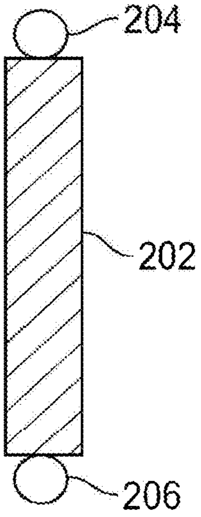
FIGS. 4A-4C are example configurations for coupling magnets to the track of the centripetal magnet accelerators of FIGS. 2A and 2B, according to some embodiments.
Figure 4B:
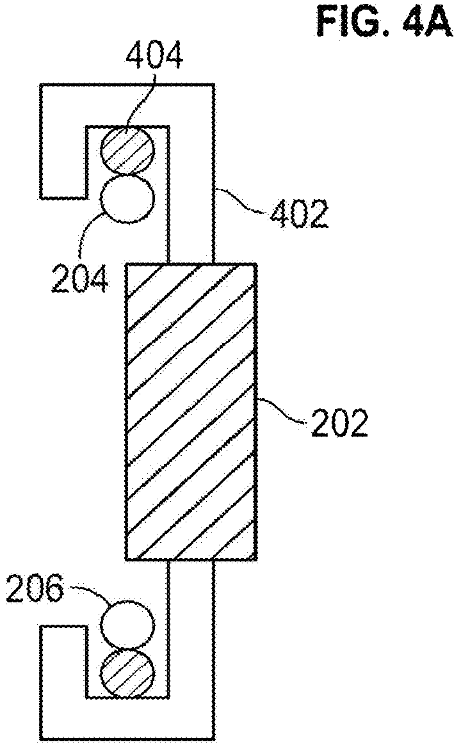
Figure 4C:
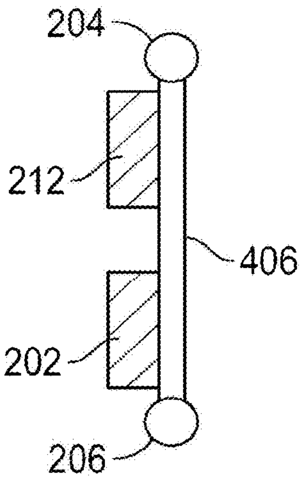

Referring now to FIGS. 4A-4C, example configurations for coupling magnets (e.g., first magnetic units 202) to circular track assembly 208 of accelerator 200 are shown, according to some embodiments. As discussed above, for example, first magnetic units 202 may be permanently, removably, and/or movably coupled to upper circular track 204 and/or lower circular track 206 depending on a configuration of accelerator 200. While a number of configurations are shown in FIGS. 4A-4C, it will be appreciated that other suitable methods or systems for coupling first magnetic units 202 to circular track assembly 208 are also contemplated herein. Thus, the examples described below are not intended to be limiting.

Turning first to FIG. 4A, a configuration of permanently and/or fixedly coupling first magnetic units 202 to circular track assembly 208 is shown. The configuration shown may be utilized in a configuration of accelerator 200 where circular track assembly 208 rotates and first magnetic units 202 remain stationary with respect to circular track assembly 208. In particular, one of first magnet units 202 is shown to be coupled directly to upper circular track 204 and lower circular track 206. In some embodiments, this configuration is achieved by welding or bolting first magnetic units 202 to upper circular track 204 and lower circular track 206. In other embodiments, another method of fixing first magnetic units 202 to upper circular track 204 and lower circular track 206 is utilized.

In some embodiments, as discussed above, first magnetic units 202 may rotate about circular track assembly 208, while circular track assembly 208 remains relatively stationary. Accordingly, first magnetic units 202 may be coupled to upper circular track 204 and lower circular track 206 by one or more brackets 402, as shown in FIG. 4B. In some embodiments, brackets 402 may be separated from upper circular track 204 and lower circular track 206 by roller assemblies 404. Roller assemblies 404 may include wheels, bearings, or any other component that can support brackets 402 on upper circular track 204 and lower circular track 206, while allowing first magnetic units 202 to move along upper circular track 204 and lower circular track 206. In other words, roller assemblies 404 allow first magnetic units 202 to rotate freely about circular track assembly 408.

In some embodiments, first magnetic units 202 are mounted to a mounting surface 406, rather than being coupled directed to upper circular track 204 and lower circular track 206, as shown in FIG. 4C. In some such embodiments, mounting surface 406 may be a plate (e.g., aluminum sheet metal) to which first magnetic units 202 may be bolted, welded, or otherwise secured. In the example shown, two of first magnetic units 202 are mounted on mounting surface 406, and mounting surface 406 is coupled to upper circular track 204 and lower circular track 206. In some embodiment, mounting surface 406 is directed coupled to upper circular track 204 and lower circular track 206 by welding, bolting, etc., such that first magnetic units 202 are fixed to circular track assembly 208, and circular track assembly 208 rotates about the axis of rotation. In other embodiment, mounting surface 406 is removably or movably (e.g., slidably) coupled to upper circular track 204 and lower circular track 206 such that first magnetic units 202 are free to rotate about to circular track assembly 208.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. An assembly for generating electricity, the assembly comprising:

a circular track configured to rotate about a first axis of rotation;

a plurality of wedge-shaped first magnets coupled to the circular track, each wedge-shaped first magnet having a first face that is at an angle with respect to the first axis of rotation;

a second magnet positioned at a center of the circular track, the second magnet comprising a conical portion, wherein a face of the second magnet is a same polarity as first faces of the plurality of wedge-shaped first magnets such that the second magnet repels the plurality of wedge-shaped first magnets to rotate the circular track; and an electromagnetic device for converting rotational motion from the circular track into electricity.

2. The assembly of claim 1, wherein:

each of the plurality of wedge-shaped first magnets is coupled to the circular track by a carrier, and wherein each carrier is supported on the circular track by a roller assembly comprising wheels or bearings.

3. The assembly of claim 2, wherein:

the carrier for each of the plurality of wedge-shaped first magnets comprises aluminum.

4. The assembly of claim 1, wherein:

the plurality of wedge-shaped first magnets comprises eight wedge-shaped first magnets equally spaced around a circumference of the circular track.

5. The assembly of claim 1, wherein:

each wedge-shaped first magnet comprises a second face, and the second face is positioned closer to the face of the second magnet than the first face.

6. The assembly of claim 5, wherein:

each of the plurality of wedge-shaped first magnets is oriented with the second face as a leading edge and the first face as a trailing edge in a direction of rotation of the circular track.

7. The assembly of claim 6, wherein:

a stronger repulsive force on the leading edge than the trailing edge pushes the wedge- shaped first magnet forward.

8. The assembly of claim 1, wherein:

the second magnet comprises a plurality of cylindrical magnets stacked on a cone-shaped magnet.

9. The assembly of claim 1, wherein:

the second magnet is supported by one or more support arms configured to position the second magnet at the center of the circular track.

10. The assembly of claim 9, wherein:

the one or more support arms extend from the second magnet to the circular track or to a housing enclosing the circular track.

11. The assembly of claim 1, wherein:

the plurality of wedge-shaped first magnets and the second magnet comprise permanent magnets.

12. The assembly of claim 11, wherein:

the permanent magnets comprise neodymium magnets.

13. The assembly of claim 1, further comprising:

a gear set positioned between the circular track and the electromagnetic device for converting rotational motion from the circular track into electricity, the gear set configured to increase or decrease a rotational speed of the electromagnetic device according to one or more different gear ratios.

14. The assembly of claim 13, wherein:

the gear set comprises planetary gears.

15. The assembly of claim 1, further comprising:

a shaft extending from the electromagnetic device to the circular track, the shaft defining the first axis of rotation.

16. The assembly of claim 1, further comprising:

a housing configured to enclose the circular track and the second magnet.

17. The assembly of claim 16, wherein:

the housing is structured to maintain a vacuum.

18. The assembly of claim 1, wherein:

the second magnet comprises a support structure shaped as a cone, a pyramid, a hemisphere, a conical frustum, or a cylinder.

19. The assembly of claim 1, wherein:

the second magnet comprises a cone-shaped magnet at a lowermost portion of the second magnet.

20. The assembly of claim 1, wherein:

the second magnet has a stronger magnetic field than each of the plurality of wedge-shaped first magnets.

* * * * *